Jan. 20, 1931.  W. E. POTTEIGER  1,789,390
COMBINATION FAUCET
Filed July 11, 1927   2 Sheets-Sheet 1
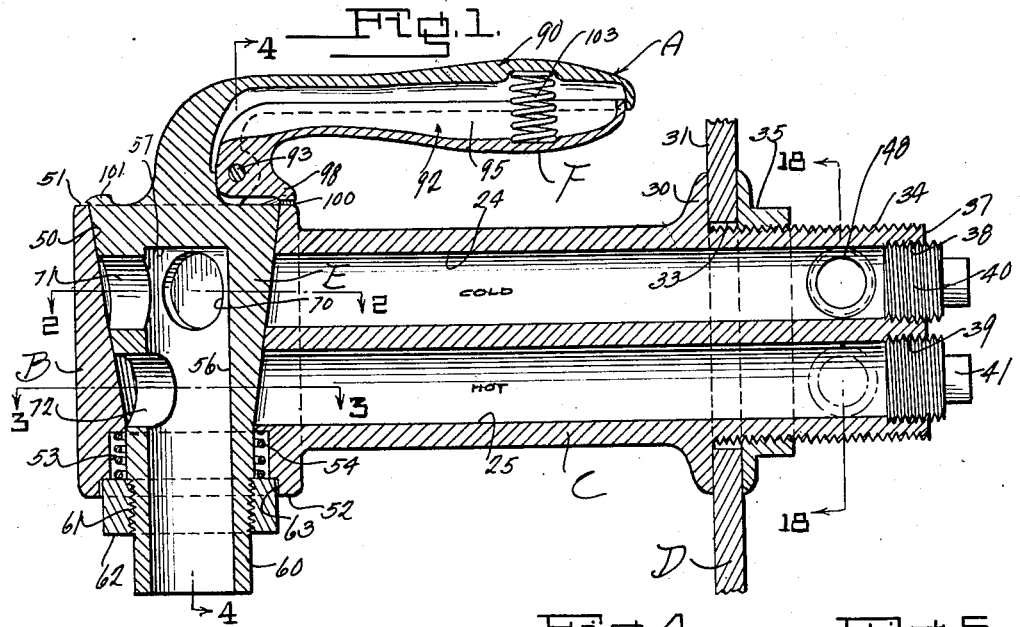
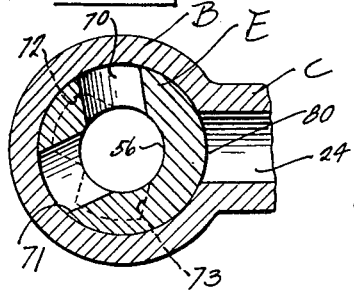
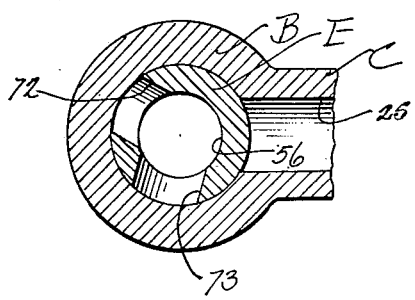
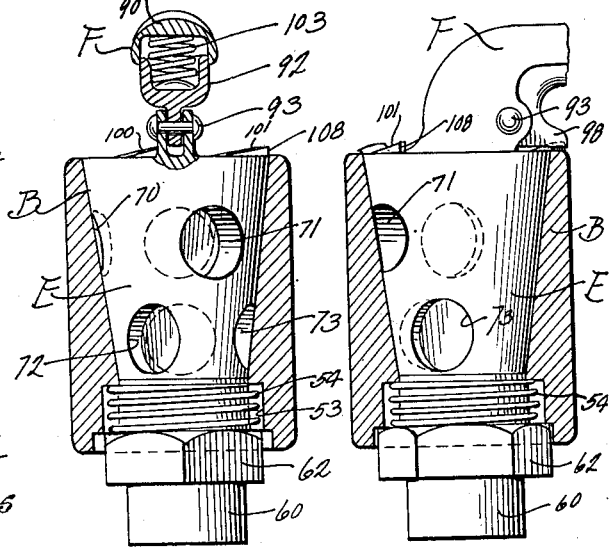
William E. Potteiger
Inventor Jan. 20, 1931.    W. E. POTTEIGER    1,789,390
COMBINATION FAUCET
Filed July 11, 1927    2 Sheets-Sheet 2
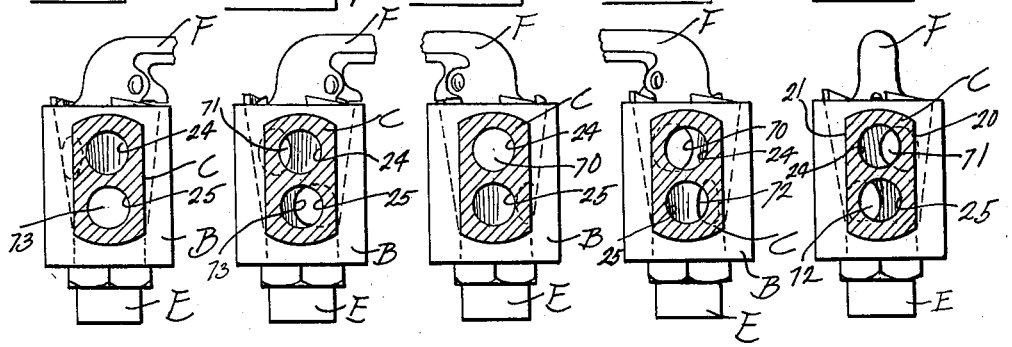
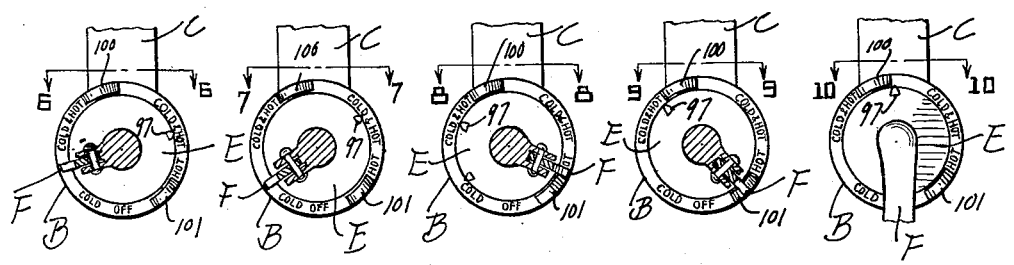
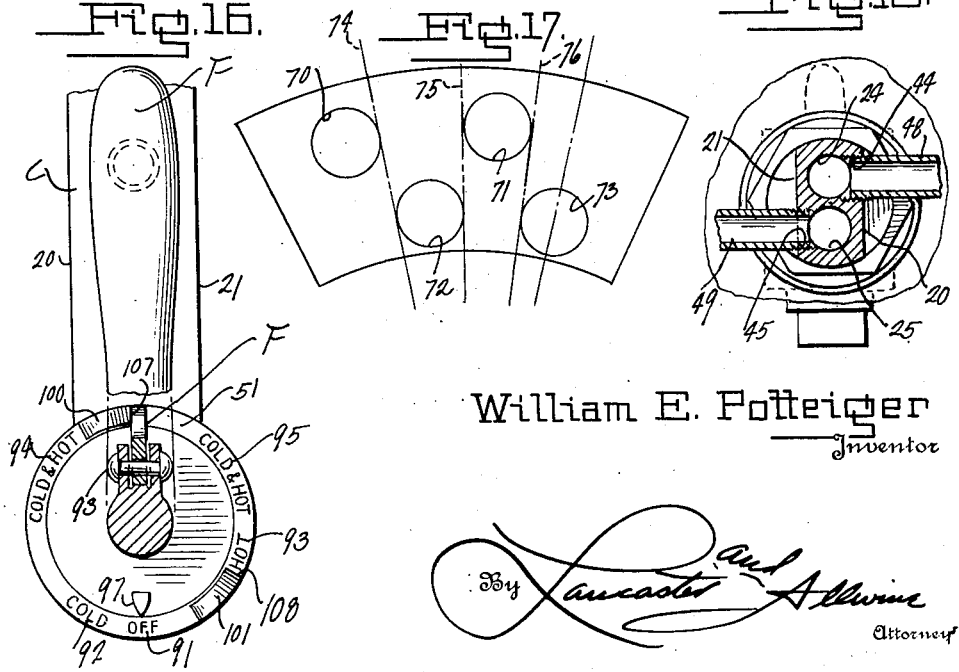
William E. Potteiger
Inventor Patented Jan. 20, 1931

1,789,390

UNITED STATES PATENT OFFICE

WILLIAM E. POTTEIGER, OF HERSHEY, PENNSYLVANIA

COMBINATION FAUCET

Application filed July 11, 1927. Serial No. 204,867.

This invention relates to improvements in combination faucets.

The primary object of this invention is the provision of a relatively simple, and economically constructed faucet by means of which hot or cold water individually or in combination may be dispensed from a single faucet, by a regulating manipulation of the handle of the faucet.

A further object of this invention is the provision of a relatively simple, sturdy, and durable valve construction, of the faucet type, embodying but few parts, and by means of which, by one rotary movement, hot or cold water may be dispensed individually, or warm water of varying temperature, as desired.

A further object of this invention is the provision of a combination faucet adapted to dispense hot and cold water from hot and cold water mains by means of a valve having a plurality of ports for each main so cooperatively positioned as to permit the water to be dispensed with varying degrees of temperature, as desired.

Other objects and advantages of this invention will be apparent during the course of the following detailed description.

In the accompanying drawings, forming a part of this specification, and wherein similar reference characters designate corresponding parts throughout the several views, Figure 1 is a longitudinal sectional view taken through the improved faucet construction, with the left end of the section taken through planes intersecting the ports 71 and 72, in order to show such ports in full line positions.

Figures 2 and 3 are horizontal sectional views taken substantially on their respective lines in Figure 1 of the drawings.

Figure 4 is a sectional view taken substantially on the line 4—4 of Figure 1, showing the valve in front elevation and the valve seat in section.

Figure 5 is a sectional view showing the valve turned in side elevation in its seat to a position 90° from its position shown in Figure 4, showing the valve in side elevation.

Figure 6 to 10 inclusive are views showing the various port adjusted positions of the valve with respect to cold and hot water supply ducts.

Figures 11 to 15 inclusive are plan views respectively of the position of the structure shown in Figures 6 to 10 inclusive, these figures showing the section lines on which Figures 6 to 10 inclusive are taken.

Figure 16 is a fragmentary view, partly in section, of the plan of the improved faucet.

Figure 17 is a developed view of the valve external surface, showing the port arrangement therefor.

Figure 18 is a sectional view taken substantially on the line 18—18 of Figure 1.

In the drawings, wherein for the purpose of illustration is shown only a preferred embodiment of the invention, the letter A may generally designate the improved faucet construction, which may include a valve casing B having integrally associated therewith a supporting conduit construction C adapted for attachment to a supporting wall or support D. A preferably conical valve E is supported in the valve casing B, having a novel port arrangement therein for cooperation with the ducts of the conduit construction C, and having associated therewith a novel safety handle construction F.

The construction C, is polygonal in cross section, the same being provided with opposite flat sides 20 and 21, and with top and bottom surfaces concentrically struck from the center of the cross section of said conduit C. The conduit or pipe C is provided longitudinally thereof with an upper cold water duct 24, and a lower hot water duct 25, both of which are circular in cross section and of the same size.

Intermediate its ends, and preferably closer to the attaching end thereof, opposite the valve supporting end, the said pipe or conduit C is provided with an integral flange 30, surrounding the same, which is adapted to abut against the forward surface 31 of the attaching wall D, which may be a sink wall or the like; so that the end of the conduit C may be inserted through an opening 33 into said wall D. The rear or attaching end of the said conduit C, at the opposite side of the flange 30, from the cone valve E is provided with screw threads 34 on the top and bottom arcuated surfaces of the said conduit, adapted to adjustably receive a clamping nut 35, so that upon rotation of the said nut the same will be fed longitudinally of the conduit C to clamp against the inner side of the wall D, in order to hold the conduit C in a horizontal position, forwardly extending for a relatively long distance from the wall D, and normal thereto.

At the extreme rear end surface 37 of the conduit C, the same is provided with screw threaded openings 38 and 39 respectively for the ducts 24 and 25, which may receive screw threaded coupling connections for cold and hot water supply mains, or which may receive imperforate plugs 40 and 41 respectively to plug the same. As a preferred attachment for cold and hot water mains, as illustrated in Figure 18, the body of the conduit C at the rear end is provided with a lateral screw threaded opening 44 inwardly of the side 20 thereof, communicating into the upper cold water duct 24, and at the opposite side 21 the said conduit C is provided with a screw threaded opening 45 extending into the duct 25. Into these screw threaded openings 44 and 45 respectively are attached cold and hot water mains or pipes 48 and 49, as more particularly illustrated in Figure 18 of the drawings. It is to be noted that the plugs 40 and 41 provide an auxiliary function in that thereby the passageways or ducts 24 and 25 may be more effectively cleansed.

Referring to the valve cage or casing B, the same is integral with the conduit C, and is provided with a tapered seat 50 therein, on a vertical axis tapering downwardly with a gradually and uniformly decreasing diameter, and opening at the top edge 51 of said valve casing, and at the bottom edge 52 thereof. Annularly about the lower end of the valve opening is provided an enlarged recess or socket 53 for the accommodation of a spiral compression spring 54, to be subsequently described. It is to be noted that the ducts 24 and 25 open directly into the valve seat 50.

The body of valve E is of tapered formation, and rotatably fits in the seat 50. It is provided with a dead end passageway 56 therethrough, opening directly at the smaller end of the said valve, and terminating at a dead end 57 in the upper enlarged end of said valve body. The smaller end of the valve E is provided with a shank 60, of hollow cylindrical formation, which extends through the socket portion 53 of the valve casing, and projects below the valve casing, and there intermediate its ends is provided with external screw threads 61 for detachably receiving a clamping nut 62. The clamping nut 62 is provided for fitting at its upper end into an enlarged socket portion 63 in the lower end of the valve casing, as illustrated in Figure 1, and the compression spring 54 seats at its lower end on the said nut 62, and is preferably entirely disposed and secreted in the socket 53, and bears at its upper end against the downwardly facing annular shoulder forming the top surface of the socket 63, in the valve casing, as illustrated in Figure 1. It is of course a purpose of this spring 54 to force the tapered valve E firmly downwardly into its seat 50, to prevent leakage of fluid, and to compensate for wear.

Transversely thru the valve E, are provided spaced upper ports 70 and 71 for the duct 24, and spaced lower ports 72 and 73 for the lower duct 25; the ports 70 and 71 being in staggered relation with respect to the ports 72 and 73, for a purpose to be subsequently described. As will be noted from the developed plane view of Figure 17, the converging lines 74, 75 and 76, show that the ports 70 to 72 inclusive do not overlap each other, that is, insofar as alignment of the same with the hot and cold water ducts 24 and 25 is concerned.

In the placement of the ports in the valve, it has been the endeavor to meet with practical conditions. For instance, a person turning a valve or faucet, will ordinarily turn the same for about a 90° movement to secure either full hot or cold position. With this idea in view, applicant has provided the ports 70 and 73 in the valve, with respect to the normal "Off" position of the valve, and with respect to each other, so that from the "Off" position, designated in Figure 2 of the drawings, and the position of the handle is illustrated in Figure 16, the operator of necessity has to turn thru an arc of 90° more or less, to either side of the normal "Off" position of the handle, to secure the hot or cold full flow of water, and without securing any mixture of the two. It is further the intention that the handle of the valve shall be swung thru 180°, under normal functioning, to secure a distributed or "warm" mixture of the hot and cold water. With this in view, it is to be noted that the ports 70, 71, 72 and 73 cover a composite circumferential area which is but slightly more than one-half of the total circumference of the valve, and this leaves an imperforate portion designated at 80 in Figure 2 of the drawings, which faces the cold and hot water ducts 24 and 25 when the valve is in its normal "Off" position as illustrated in Figure 16 of the drawings.

As a guide to an operation of the valve, it is preferred to place the indicia "Off", as illustrated at 91 in Figure 16 of the drawings, and to the left thereof place the indicia "Cold" designated by numeral 92 in Figure 16; and to the right of the "Off" indicia, place the indicia "Hot" designated at 93 in Figure 16 of the drawings. On the upper half of the marginal surface 51 of the valve casing, indicia such as "Cold and Hot", designated at 94 in the drawings, may be provided, and "Cold and Hot" designated at 95 in Figure 16 of the drawings, may be placed.

Under the normal functioning of the parts, the handle F will assume a longitudinally parallel position above the conduit construction, and in this position said handle extends rearwardly towards the sink wall D and the indicator 97, on the top surface of the valve E points to the indicia "Off", as illustrated in Figure 16. Now assuming that it is the desire of the operator to secure cold water, with a full flow thereof, the handle F is swung to the right, for a distance of 90°, preferably slightly greater than 90°, and this positions the indicator 97 in the position illustrated in Figure 13, and this positions the port 70 in alignment with the duct 24, for full cold water flow thru the valve passageway 56. In Figure 8 is shown the relative position of the valve duct 70 with respect to the port 24, for withdrawing cold water. Of course, between this position of the indicator 97 as shown in Figure 13, and the "Off" position, various regulating quantities of cold water may be withdrawn.

If it is desired to draw hot water, from an "Off" position, the handle F is turned to the left, for slightly over a 90° turn, to the position of the indicator 97 in Figure 11 of the drawings, and in this position illustrated in section in Figure 6, the port 73 of the valve will completely align with the duct 25 of the conduit C, to effect a full flow of hot water from the valve passageway 56, as can readily be understood. Of course various degrees of flow of the hot water may be obtained by adjusting the indicator 97 to positions intermediate the "Off" position and the pisition of said indicater 97 in Figure 11 of the drawings.

In order to obtain a mixture of hot and cold water, it is contemplated that under normal operation the valve handle F will be swung thru an arc of 180° from its "Off" position illustrated in Figure 16, so that the indicator 97 will then lie in the position illustrated in Figure 15, and in this relationship of parts the ports 71 and 72 will respectively communicate with their ducts 24 and 25, in the partially open relation illustrated in Figure 10, for an equal flow of hot and cold water into the valve passageway 56, as can readily be understood. Of course by a slight degree of movement of the handle F from the position illustrated in Figure 15, to either the right or the left, various degrees of cold and hot water mixture may be obtained, to obtain the temperature desired.

As illustrated in Figures 7 and 12 of the drawings, the indicator 97 may be swung by operating the valve thru the handle F, so that the ports 71 and 73 will overlap with the ducts 24 and 25, to draw a mixture of hot and cold water. In similar manner the handle may be turned so that the indicator will point as illustrated in Figure 14, so that the ducts 70 and 72 will align with the ducts 24 and 25, as illustrated in Figure 9, for drawing a mixture of hot and cold water.

In connection with operation of the valve or faucet, for the protection of children, so that cold water only may be withdrawn, it is preferred to provide a detent which must be released in order to withdraw hot water or a mixture of hot and cold water. To this end, it is preferred to place the detent as part of the handle construction F. The handle structure F includes the upper elongated half section or portion 90, and is rigidly connected axially in the top of the valve E. The handle furthermore includes a lower elongated movable portion 92, hinged at 93 onto the handle section 90 at the juncture of the latter, with the valve E. These handle sections 90 and 92 are recessed on their facing sides to provide a compartment 95; it being intended that the section 92 will telescope in the recess in the section 90, about the margin thereof, to completely enclose the compartment 95, and prevent the settlement of foreign material therein, and preventing pinching of fingers and the like, it is preferred that a telescopic fit of the sections 90 and 92 be accomplished. The section 92 is provided with the detent 98 referred to, which projects towards the outer marginal portion of the valve E at the top thereof, and which is of course integral with the handle section 92, and which operates between detent lugs 100 and 101, formed on the top marginal surface 51 of the valve E, and integral with the latter. A compression spring 103 is placed in the handle compartment between the handle sections, as illustrated in Figure 1, to normally force the detent 98 downwardly onto a seating engagement at the lower edge over the top surface of the valve casing B. The detent lugs 100 and 101, rigid on the top edge of the casing B, are provided with abrupt shoulders 107 and 108 respectively, in facing relation, which the detent 98 may engage to permit rotation of the valve E only within the limits between the lugs 100 and 101, unless the handle section 92 is pivotally moved upward by compressing the spring 103, by gripping the handle F, in order to elevate the detent 98 to above the shoulders 107 and 108 of said lugs 100 and 101. In the arc of movement between the abrupt shoulders 107 and 108 of said lugs, the indicator 97 may be swung from the "Off" position illustrated in Figure 16 to the full cold position illustrated in Figure 13, and it is thus apparent that in the arc of movement permitted of the valve E without elevating the detent 98, that only cold water may be withdrawn. Thus the faucet is rendered safe for use by children, without liability of withdrawal of hot water or warm water. The top surface of the lugs 100 and 101 at opposite sides from the abrupt shoulders gradually slope into the top surface 51 of the valve casing, as illustrated in Figures 4 and 5 of the drawings. It is quite apparent that in order to withdraw hot water or warm water, it will be necessary to press upon the handle, to elevate the detent 98 and swing the same over the lugs to assume any of the positions illustrated in Figures 6, 7, 9 and 10 of the drawings.

From the foregoing description of this invention it is apparent that a novel faucet construction has been provided, which embodies features of port arrangement for the valve, which will permit of an efficient and practical withdrawal of hot and cold water, or warm water, and with an added safety factor.

Various changes in the shape, size, and arrangement of parts may be made to the form of invention herein shown and described, without departing from the spirit of the invention or the scope of the claims.

I claim:

1. In a faucet construction the combination of a valve seat having hot and cold water inlet ducts thereto, a valve rotatable on said seat, said valve having therein individual cold and hot water ports for the cold and hot water ducts, and a pair of non-connected cold and hot water ports for combination use with the cold and hot water ducts.

2. In a combination faucet of the class described a conduit having hot and cold water ducts therein, a casing carried by said conduit having a valve seat therein into which said hot and cold water ducts open, a valve movably supported upon said seat having a passageway therein opening therefrom, said valve having therein a pair of non-connected ports communicating with the valve passageway for alignment with the cold water duct, and a pair of ports therein opening in the valve passageway for alignment with the hot water duct, said pairs of ports of the valve being so arranged that the ports of one pair are vertically staggered on the valve with respect to the ports of the other pair of ports, each of said ports being non-connected with the others.

3. In a combination faucet a valve having hot and cold water ports therein, a valve casing having a seat for the valve and having hot and cold water duct means with which the ports of the valve may communicate, said ports and ducts being so arranged that full hot or full cold water flow may be obtained or a combination flow of hot and cold water, and releasable detent means for permitting a limited swing of the valve to normally prevent any flow of water except a regulatable cold water flow thru said valve ports.

4. In a combination faucet a valve casing having a valve seat therein and cold and hot water inlet ducts on said seat, a valve rotatable in said seat, said valve having a plurality of ports arranged therein for alignment with the ducts of said valve casing and so arranged that from an "Off" position it will be necessary to turn the valve thru substantially an arc of 90° to one side of the normal "Off" position to withdraw hot water or for movement thru an arc of substantially 90° to the opposite side of the normal "Off" position for withdrawal of cold water, said valve having other ports arranged between the first mentioned ports for alignment with the ducts of the valve casing to withdraw a combination flow of hot and cold water from said ducts upon turning of the valve thru an arc of substantially 180°.

5. In a faucet of the class described a valve, a valve casing having a seat therein for the valve, said valve casing having a hot water inlet duct to the seat thereof and a cold water inlet duct to the seat thereof, said valve having therein an individual port for the hot water duct, an individual port for the cold water duct, and ports between the first mentioned ports for combination communication with the hot and cold water inlet ducts, said ports of the valve being arranged on the valve so that a circumferential portion of over 90° of the valve throughout the length thereof is imperforate.

6. In a faucet construction of the class described a valve, a valve casing having a seat for the valve, said valve casing having hot and cold water inlet ducts, said valve having hot and cold water ports for alignment with the hot and cold water inlet ducts, a handle construction associated with the valve including a portion rigid with the valve and a portion movable with respect to the valve, a detent operatively supported by the movable portion of the handle, and teeth on the valve casing on which said detent cooperates to normally permit a limited swing of the valve whereby regulated cold water flow only will be permitted from the valve by alignment of the cold water port of the valve with the cold water inlet duct of the valve casing.

WILLIAM E. POTTEIGER.